United States Patent
Takamuku et al.

(10) Patent No.: US 11,611,395 B2
(45) Date of Patent: Mar. 21, 2023

(54) ADAPTIVE EQUALIZATION DEVICE, ADAPTIVE EQUALIZATION METHOD, AND COMMUNICATION DEVICE

(71) Applicant: NTT Electronics Corporation, Yokohama (JP)

(72) Inventors: Tomohiro Takamuku, Kanagawa (JP); Mitsuteru Yoshida, Kanagawa (JP); Tsutomu Takeya, Kanagawa (JP); Kazuhito Takei, Kanagawa (JP); Katsuichi Oyama, Kanagawa (JP); Tomoharu Semboku, Kanagawa (JP)

(73) Assignee: NTT ELECTRONICS CORPORATION, Yokohama (JP)

( * ) Notice: Subject to any disclaimer, the term of this patent is extended or adjusted under 35 U.S.C. 154(b) by 205 days.

(21) Appl. No.: 17/273,544

(22) PCT Filed: Oct. 7, 2019

(86) PCT No.: PCT/JP2019/039488
§ 371 (c)(1),
(2) Date: Mar. 4, 2021

(87) PCT Pub. No.: WO2020/075673
PCT Pub. Date: Apr. 16, 2020

(65) Prior Publication Data
US 2021/0344424 A1 Nov. 4, 2021

(30) Foreign Application Priority Data
Oct. 9, 2018 (JP) .............................. JP2018-191007

(51) Int. Cl.
*H04B 10/2507* (2013.01)
*H04B 10/2569* (2013.01)
*H04B 10/61* (2013.01)

(52) U.S. Cl.
CPC ..... *H04B 10/2569* (2013.01); *H04B 10/2507* (2013.01); *H04B 10/615* (2013.01); *H04B 10/6162* (2013.01)

(58) Field of Classification Search
CPC .................................................. H04B 10/2507
See application file for complete search history.

(56) References Cited

U.S. PATENT DOCUMENTS

| 7,894,728 B1 * | 2/2011 | Sun | H04L 7/0004 |
| | | | 398/208 |
| 8,478,137 B2 * | 7/2013 | Komaki | H04B 10/6971 |
| | | | 398/208 |

(Continued)

FOREIGN PATENT DOCUMENTS

| JP | 2011-9956 A | 1/2011 |
| JP | 2011-15013 A | 1/2011 |

(Continued)

OTHER PUBLICATIONS

International Search Report and Written Opinion of the International Searching Authority issued by Japan Patent Office for corresponding International Patent Application No. PCT/JP2019/039488, dated Oct. 29, 2019, with a partial English translation.

*Primary Examiner* — Jai M Lee
(74) *Attorney, Agent, or Firm* — Myers Wolin, LLC

(57) ABSTRACT

First compensation circuitry includes a first digital filter compensating a phase difference between a phase of a symbol of a received signal and a sampling timing, and first filter coefficient calculation circuitry calculating a filter coefficient of the first digital filter as a first filter coefficient. Second filter coefficient calculation circuitry calculates, as a second filter coefficient, a filter coefficient for adaptive equalization that compensates distortion due to temporally changing polarization dispersion, based on an output of the first digital filter. Coefficient combination circuitry combines (Continued)

the first filter coefficient and the second filter coefficient. Second compensation circuitry includes a second digital filter which uses a filter coefficient combined by the coefficient combination circuitry and performs a compensation of the phase difference between the phase of the symbol of the received signal and the sampling timing, and a process of the adaptive equalization at the same time.

7 Claims, 6 Drawing Sheets

(56) References Cited

U.S. PATENT DOCUMENTS

| | | | |
|---|---|---|---|
| 9,100,126 B2* | 8/2015 | Abe | H04B 10/532 |
| 10,305,675 B2* | 5/2019 | Onuma | H04B 1/16 |
| 10,608,743 B2* | 3/2020 | Takamuku | H04B 10/61 |
| 2010/0329697 A1* | 12/2010 | Koizumi | H04L 27/2276 |
| | | | 398/208 |
| 2010/0329698 A1* | 12/2010 | Nakashima | H04B 10/6161 |
| | | | 398/208 |
| 2018/0175830 A1 | 6/2018 | Onuma et al. | |
| 2018/0302211 A1 | 10/2018 | Onuma et al. | |

FOREIGN PATENT DOCUMENTS

| | | |
|---|---|---|
| JP | 2017-163239 A | 9/2017 |
| JP | 2017-163281 A | 9/2017 |

* cited by examiner

ADAPTIVE EQUALIZATION DEVICE, ADAPTIVE EQUALIZATION METHOD, AND COMMUNICATION DEVICE

CROSS-REFERENCE TO RELATED APPLICATION

This application is a national stage application of International Application No. PCT/JP2019/039488, filed on Oct. 7, 2019 and designated the U.S., which claims priority to Japanese Patent Application No. 2018-191007, filed on Oct. 9, 2018. The contents of each are herein incorporated by reference.

FIELD

The present disclosure relates to an adaptive equalization device, an adaptive equalization method, and a communication device that compensate characteristics of a transmission path in data communication.

BACKGROUND

In coherent optical communication, by compensating a synchronization error from processing timing and a distortion of a transmission signal on a reception side through digital signal processing, large capacity transmission of several tens of gigabits per second or higher is achieved. In the digital signal processing, particularly, processes such as of chromatic dispersion compensation, frequency control and phase adjustment, polarization demultiplexing, and polarization dispersion compensation are performed. The processes of polarization demultiplexing and polarization dispersion compensation are performed mainly by adaptive equalization. To achieve further increase in capacity, compensation accuracies thereof are required to be further improved. Accompanied by increase in speed in transmission rate, there is a problem of increase in circuit scale and power consumption of digital signal processing. In particular, the processes of frequency control and phase adjustment and of adaptive equalization are processes that largely affect transmission characteristics and increase the circuit scale in the digital signal processing. Accordingly, accurate processing with a small-sized circuit is desired.

The processes of frequency control and phase adjustment have been achieved by feeding back the phase difference between a received signal and processing timing to a sampling frequency controller of an A/D converter and to a phase adjuster for the received signal (for example, see PTL 1). The processes of the frequency control and phase adjustment can be achieved by causing the received signal to always track the processing timing without constituting a synchronization loop (for example, see PTL 2). According to the two methods, a digital filter is used as means for adjusting the phase, and by changing filter coefficients, the phase of an output signal is adjusted. Furthermore, a process of controlling the sampling frequency for the sake of achieving low power consumption can also be added (for example, PTL 3).

The adaptive equalization is an important function in digital signal processing, and mainly performs compensation for temporally changing situations, such as polarization demultiplexing, and polarization dispersion compensation. Typically, an adaptive equalizer may be a digital filter, and can compensate a transmission signal by setting, in the digital filter, tap coefficients that can cancel a distortion of a transmission signal (for example, see PTL 4). The tap coefficients are successively updated in conformity with the temporally changing situations.

CITATION LIST

Patent Literature

[PTL 1] JP 2011-009956 A
[PTL 2] JP 2017-163239 A
[PTL 3] JP 2017-163281 A
[PTL 4] JP 2011-015013 A

SUMMARY

Technical Problem

Conventionally, frequency control, phase adjustment, and adaptive equalization have been sequentially executed in digital filters. In the digital filter, multiplication between digital data items represented in finite numbers of bits is performed. A multiplication result is also limited by a finite number of bits. A rounded-down number of bits becomes an error. Consequently, as multiplication processes of frequency control, phase adjustment, and adaptive equalization are sequentially executed, the error is accumulated accordingly. There has been a possibility that the error results in degradation of the signal.

The present disclosure has been made in order to solve the problem as described above, and has an object to obtain an adaptive equalization device, an adaptive equalization method, and a communication device that can prevent signal degradation due to a computation error, and improve the performance.

Solution to Problem

An adaptive equalization device according to the present disclosure includes: first compensation circuitry including a first digital filter compensating a phase difference between a phase of a symbol of a received signal and a sampling timing, and first filter coefficient calculation circuitry calculating a filter coefficient of the first digital filter as a first filter coefficient; second filter coefficient calculation circuitry calculating, as a second filter coefficient, a filter coefficient for adaptive equalization and a compensation of distortion due to temporally changing polarization dispersion, based on an output of the first digital filter; coefficient combination circuitry combining the first filter coefficient and the second filter coefficient; and second compensation circuitry including a second digital filter which uses a filter coefficient combined by the coefficient combination circuitry and performs a compensation of the phase difference between the phase of the symbol of the received signal and the sampling timing, and a process of the adaptive equalization at the same time.

Advantageous Effects

In the present disclosure, signal degradation due to the computation error can be prevented, and the performance can be improved.

DESCRIPTION OF EMBODIMENTS

An adaptive equalization device, an adaptive equalization method, and a communication device according to the embodiments of the present disclosure will be described with reference to the drawings. The same components will be denoted by the same symbols, and the repeated description thereof may be omitted.

Embodiment 1

Figure 1:
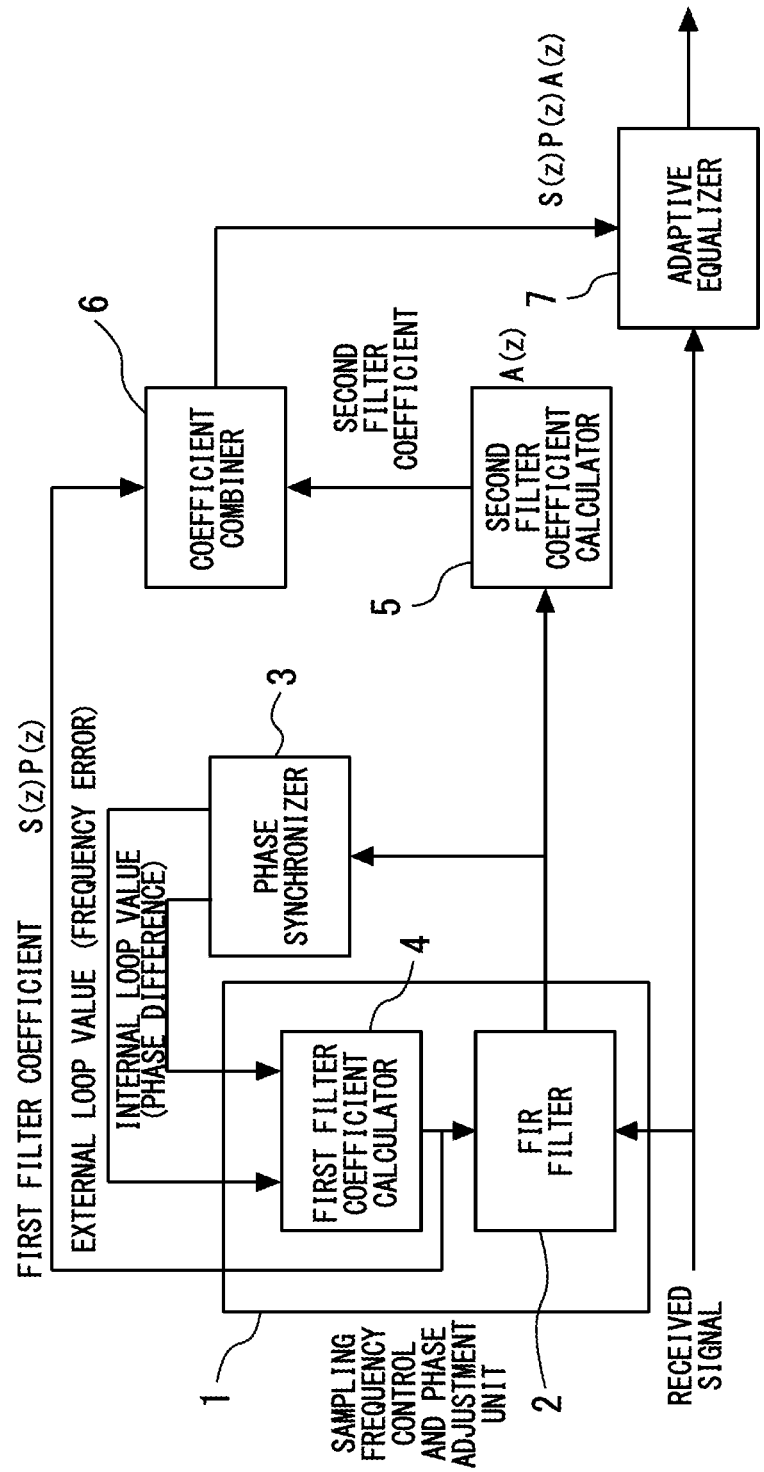
FIG. 1 shows an adaptive equalization device according to Embodiment 1.

FIG. 1 shows an adaptive equalization device according to Embodiment 1. The adaptive equalization device is provided on a reception side of a communication device. A received signal is a data string (sampling signal) sampled at a predetermined sampling rate. The sampling rate of the received signal is 1.5 samples/symbol (1.5 s/s), that is, 1.5 samples per symbol. Data for one sample is typically indicated by several bits (for example, seven bits or eight bits). The symbol is a unit of forming an information bit in the received signal.

A sampling frequency control and phase adjustment unit 1 performs a process of phase adjustment that compensates the received signal for the phase difference from the sampling signal (the phase difference between the phase of the symbol of the received signal and the sampling timing), and a process of sampling frequency control (including sampling rate conversion) that compensates the received signal for a frequency error from the sampling signal (the frequency error between the symbol rate of the received signal and the sampling frequency), at the same time through the same FIR filter 2. A signal obtained by applying the sampling frequency control and the phase adjustment to the received signal is supplied to a phase synchronizer 3. The phase synchronizer 3 detects an external loop value and an internal loop value, and feeds back the values to the sampling frequency control and phase adjustment unit 1. The external loop value is a value obtained by detecting the frequency error between the symbol rate of the received signal and the sampling frequency (the frequency in a case of a sampling rate of 1 s/s). The internal loop value is a value obtained by detecting the phase difference between the phase of the symbol of the received signal and the sampling timing. By compensating the phase, the sampling timing can be aligned with the center part of the symbol, and the accuracy of data identification can be improved.

The frequency error is used to compensate the frequency error between the symbol rate and the sampling frequency (note that the frequency when the sampling rate is assumed to be 1 s/s). The phase difference is used for compensation for the error between the timing of the symbol and the timing of sampling (or for synchronization). Specifically, in a first filter coefficient calculator 4, filter coefficients for compensating the frequency error, and filter coefficients for compensating the phase difference are calculated, and furthermore, first filter coefficients in which both the filter coefficients are convolved are calculated. The first filter coefficients are set in the internal FIR filter 2, and compensation for the frequency error and compensation for the phase difference can be performed at the same time. Furthermore, sampling rate conversion is also performed at the same time. Note that filter coefficient calculation is easily performed using a coefficient table. In particular, compensation for the sampling frequency error can be performed by controlling a sampling clock to be supplied to a data-supplying-FIFO, besides the FIR filter 2 (for example, see PTL 2). The transfer function of the sampling frequency control and phase adjustment unit 1 is represented as S(z) P(z).

A signal obtained by processes by the sampling frequency control and phase adjustment unit 1 is supplied to a second filter coefficient calculator 5. The second filter coefficient calculator 5 calculates, as second filter coefficients, filter coefficients for adaptive equalization for compensating the distortion due to temporally changing polarization dispersion, on the basis of the output of the sampling frequency control and phase adjustment unit 1. A coefficient combiner 6 then combines the first filter coefficients and the second filter coefficients with each other. Typically, the combination is performed by convolution. The transfer function of the combined filter coefficients is indicated as S(z)P(z)A(z).

An adaptive equalizer 7 applies three processes that are compensation for the frequency error and the phase difference from the sampling signal, and adaptive equalization, to the received signal using the combined filter coefficients at the same time through the common FIR filter.

To perform adaptive equalization, the entire sampling data on the received signal is required. Consequently, the process of the adaptive equalizer 7 is performed for the entire sampling data on the received signal. On the other hand, to perform the frequency control or phase adjustment, the entire sampling data is not necessarily required. Consequently, the process of the FIR filter 2 of the sampling frequency control and phase adjustment unit 1 is performed not for the entire sampling data in the received signal, but only for a part of the sampling data at a level achieving phase synchronization, through a sampling rate conversion process. In actuality, even if the sampling data to be processed is reduced to about 50% to 25%, the target frequency control and phase adjustment can be performed. If the phase and fluctuation of the sampling data can be preliminarily suppressed, the sampling data to be processed may be reduced to 25% or less (including a configuration of reducing a clock jitter, jitters of an A/D converter and a D/A converter, and phase fluctuation).

Figure 2:
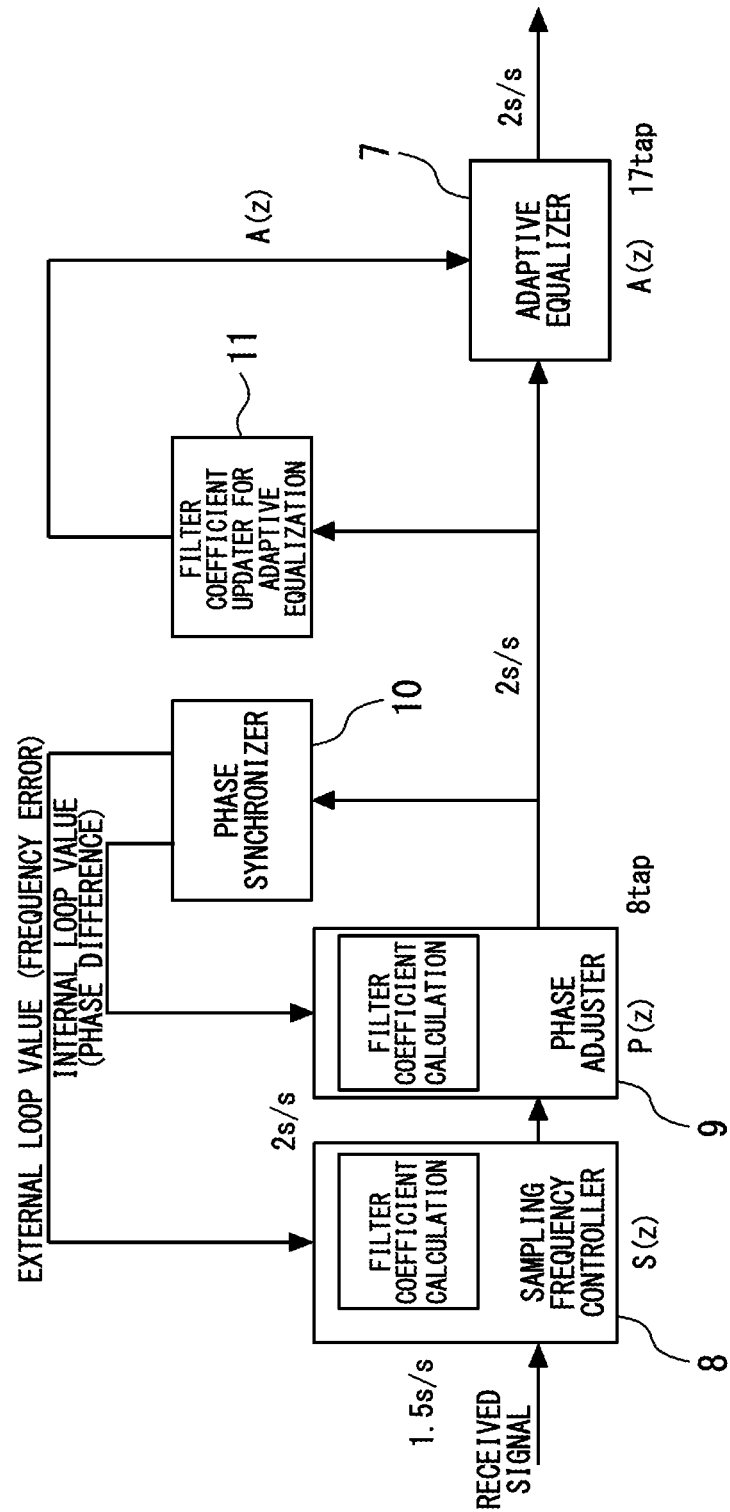
FIG. 2 shows an adaptive equalization device according to a comparison example.

Subsequently, the advantageous effects of this embodiment are described in comparison with a comparison example. FIG. 2 shows an adaptive equalization device according to a comparison example. A sampling frequency controller 8 has a function of controlling the sampling frequency (the frequency of sampling clock) (for example, synchronization with the symbol rate), and a function of converting the sampling rate (for example, converting from 1.5 s/s to 2 s/s). The details of the function of controlling the sampling frequency are described in PTL 1 and PTL 2. The details of the function of converting the sampling rate are described in PTL 3. Although not shown, the sampling frequency controller 8 has an FIR filter for interpolation and decimation processes. The sampling frequency control may not only control the source oscillation for the sampling clock in an analog manner, but also digitally perform control through frequency dividing, FIFO control, selection circuits and the like, as shown in PTL 2.

A phase adjuster 9 is a circuit for synchronizing the phase of the symbol with the timing of sampling. A phase synchronizer 10 detects the phase difference therebetween, and feeds back the phase difference to the phase adjuster 9. The details of phase adjustment are described in PTL 1 and PTL 2. The phase adjuster 9 has an FIR filter for adjusting the timing of sampling.

The phase synchronizer 10 calculates the external loop value and the internal loop value on the basis of the output of the phase adjuster 9. The external loop value is fed back to the sampling frequency controller 8. In the sampling frequency controller 8, the frequency error is compensated. At this time, control of the sampling frequency can be performed by controlling the external source oscillation for the sampling clock in an analog manner, or digitally controlling a frequency divider or the like that generates sampling. The internal loop value is fed back to the phase adjuster 9. In the phase adjuster 9, the phase difference is compensated as described above. The phase compensation can be performed by digital signal processing. The processes of sampling frequency control and phase adjustment are performed for the entire sampling data on the received signal.

The filter coefficients of the FIR filters of the sampling frequency controller 8 and the phase adjuster 9 are calculated in the respective filter coefficient calculators. The transfer functions of the filter coefficients are represented as $S(z)$ and $P(z)$, respectively.

The received signal processed in the sampling frequency controller 8 and the phase adjuster 9 is supplied to the adaptive equalizer 7, and the polarization dispersion and the like are compensated. The adaptive equalizer 7 has an FIR filter for performing the compensation process. The filter coefficients of the FIR filter are calculated by the filter coefficient updater 11 for adaptive equalization on the basis of the output of the phase adjuster 9. The transfer function of the filter coefficients is represented as $A(z)$. The situations of polarization dispersion and the like temporally change. Accordingly, the filter coefficients for compensation are successively updated. Also in the adaptive equalizer 7, processes are performed for the entire sampling data in an input signal.

As described above, the sampling frequency controller 8, the phase adjuster 9, and the adaptive equalizer 7 have the respective FIR filters. In the FIR filter, multiplication between digital data items represented in finite numbers of bits is performed. A multiplication result is also limited by a finite number of bits. Accordingly, a rounded-down number of bits becomes an error. Consequently, as multiplication processes in the sampling frequency controller 8, the phase adjuster 9 and the adaptive equalizer 7 are sequentially executed, the error is accumulated accordingly. There is a possibility that the error results in degradation of the signal.

On the contrary, according to this embodiment, the adaptive equalizer 7 applies three processes that are compensation for the frequency error and the phase difference from the sampling signal, and adaptive equalization, to the received signal at the same time through the common FIR filter. Accordingly, the number of processes for a main signal of the received signal can be reduced to one from three, which is in the comparison example. Consequently, signal degradation due to the computation error can be prevented, and the performance can be improved.

In this embodiment, the processes of the sampling frequency controller 8 and the phase adjuster 9 in the comparison example are performed by the sampling frequency control and phase adjustment unit 1, which is a circuit in which both elements are integrated. Accordingly, the number of processes of the FIR filter is reduced from two to one, which can reduce the power consumption. In comparison with the comparison example, the number of FIR filters is reduced from three to two. Accordingly, the entire circuit scale can also be reduced.

In the comparison example, the sampling frequency controller 8, the phase adjuster 9 and the adaptive equalizer 7 are connected in series. Therefore, as the sampling data to be processed by the sampling frequency controller 8 and the phase adjuster 9 is reduced, the sampling data in the process of the adaptive equalizer 7 on the subsequent stage is also reduced accordingly. Consequently, to allow the adaptive equalizer 7 to process the entire sampling data, the sampling frequency controller 8 and the phase adjuster 9 are also required to process the entire sampling data. On the contrary, in this embodiment, the process of the FIR filter 2 of the sampling frequency control and phase adjustment unit 1 can be performed not for the entire sampling data but for decimated data. Accordingly, the amount of operation can be reduced.

That is, in this embodiment, in the processes of the sampling frequency control, phase adjustment, and adaptive equalization, the filter coefficients for the sampling frequency control and the phase adjustment are obtained from a smaller amount of data than that of the entire sampling data. Accordingly, the circuit scale and the power consumption can be reduced. The process of adaptive equalization is performed by the single filter together with the sampling frequency control and the phase adjustment, thereby allowing the computation error to be reduced.

Note that for compensating the frequency error, an analog circuit may be used. In this case, the FIR filter 2 of the sampling frequency control and phase adjustment unit 1 does not perform compensation for the frequency error, but only performs compensation for the phase difference. Likewise, the FIR filter of the adaptive equalizer 7 does not perform compensation for the frequency error, but only performs processes of compensating the phase difference and of adaptive equalization. Such cases are also in the scope of the present disclosure.

Figure 3:
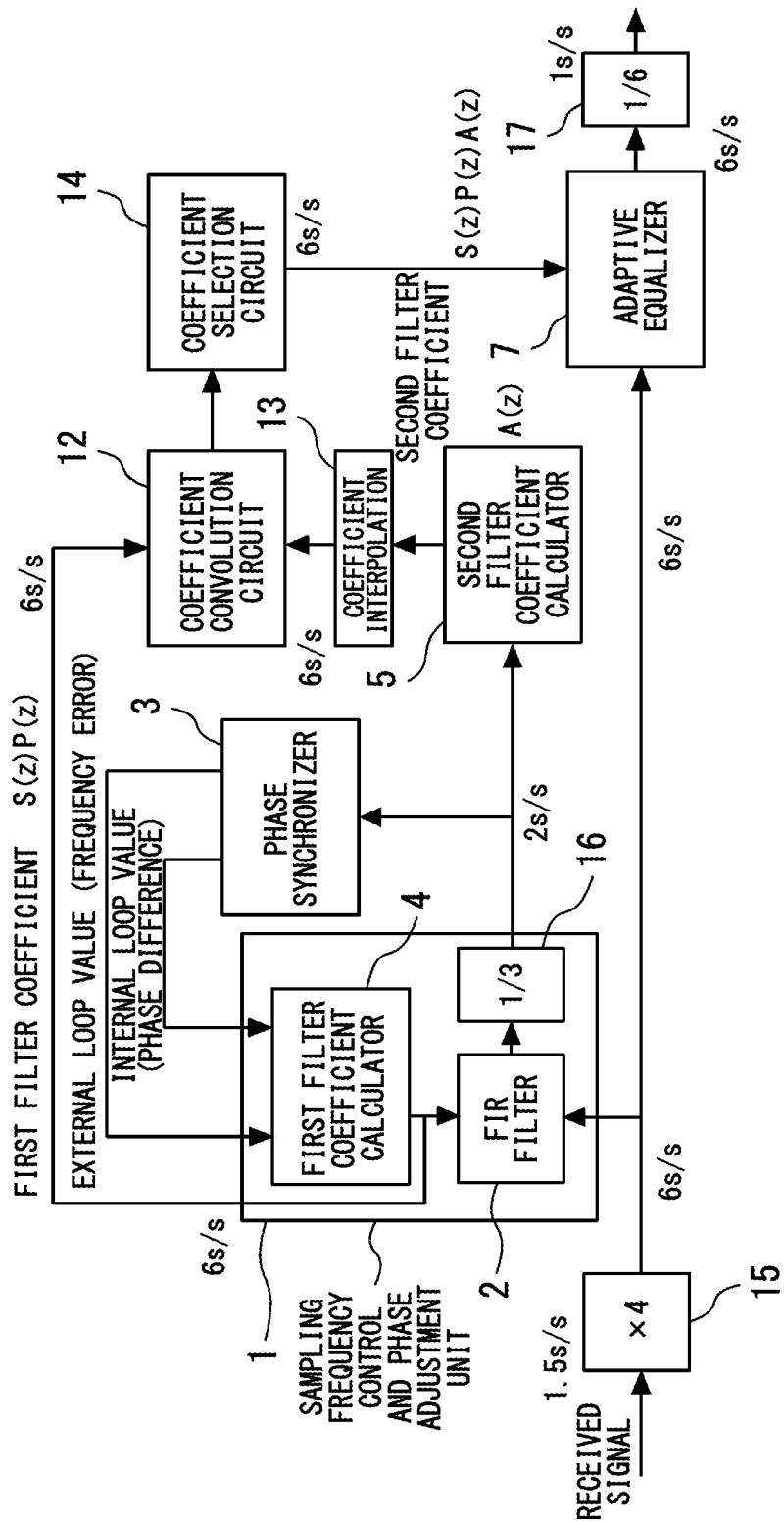
FIG. 3 shows a specific example of the adaptive equalization device according to Embodiment 1.

FIG. 3 shows a specific example of the adaptive equalization device according to Embodiment 1. The basic configuration is the same as that in FIG. 1. However, the situations of conversion of the sampling rate are specifically illustrated. The adaptive equalization device performs sampling rate conversion together, which can improve the advantageous effects of reduction in circuit scale, reduction in power consumption, low signal degradation, and low performance degradation.

Note that in FIG. 3, an ×n (n times) circuit and a 1/m circuit for converting the sampling rate are illustrated. Here, n and m are natural numbers. The ×n circuit multiplies the sampling rate n times by inserting (n−1) zero data items between adjacent sampling data items. The 1/m circuit makes the sampling rate 1/m by performing a process every m data items. Note that in a variation example described later, the sampling rate conversion is performed in the FIR filter 2 in the sampling frequency control and phase adjustment unit 1, and in the FIR filter in the adaptive equalizer 7, respectively.

The coefficient combiner 6 in FIG. 1 is specifically implemented as a coefficient convolution circuit 12 in FIG. 3. A coefficient interpolation circuit 13 is inserted between the coefficient convolution circuit 12 and the second filter coefficient calculator 5. As with the ×n circuit, the coefficient interpolation circuit 13 performs an interpolation process of coefficient values by inserting one or more zero data items between the adjacent coefficient values.

Furthermore, a coefficient selection circuit 14 is provided between the coefficient convolution circuit 12 and the adaptive equalizer 7. When an FIR filter process is performed with the filter coefficient generated as a result of the sampling rate conversion and the coefficient convolution, only some filter coefficients are enabled in conformity with input to the filter. There are several patterns of the thus enabled filter coefficients. One of the patterns is used in conformity with the input. Consequently, by selecting the pattern of the enabled filter coefficients, setting of the filter coefficients can be easily performed.

The operation of sampling rate conversion is hereinafter described. In FIG. 3, a received signal at a sampling rate of 1.5 s/s is supplied. The sampling rate of the received signal is converted by the ×4 circuit 15 from 1.5 s/s into 6 s/s.

In the sampling frequency control and phase adjustment unit 1, for the received signal converted to have 6 s/s, the processes of the sampling frequency control and the phase adjustment are performed by the FIR filter 2. The processed signal passes through a ⅓ circuit 16 and is output at a sampling rate of 2 s/s. From the output signal, the phase synchronizer 3 calculates the external loop value corresponding to the frequency error, and the internal loop value corresponding to the phase difference, and feeds these values back to the sampling frequency control and phase adjustment unit 1. The sampling frequency control and phase adjustment unit 1 calculates, at a sampling rate of 6 s/s, the first filter coefficients for compensating the external loop value and the internal loop value at the same time, and sets the coefficients in the internal FIR filter 2. The FIR filter 2 performs the processes of the sampling frequency control and the phase adjustment at the same time. The processed output is output to the outside through the ⅓ circuit 16 again. At this time, the first filter coefficients (sampling rate of 6 s/s) calculated in the sampling frequency control and phase adjustment unit 1 are supplied to the coefficient convolution circuit 12.

The filter process in the sampling frequency control and phase adjustment unit 1 described above is performed at a sampling rate of 6 s/s. The filter process is performed at a higher sampling rate than the process with a sampling rate of 2 s/s in the comparison example in FIG. 2. Consequently, the accuracy of the frequency control and the phase adjustment can be improved.

On the other hand, the output signal at the sampling rate of 2 s/s having passed through the ⅓ circuit 16 is supplied to the second filter coefficient calculator 5. Here, filter coefficients for compensating a temporally changing distortion is calculated and updated. The updated filter coefficients pass through the coefficient interpolation circuit 13, are converted into the second filter coefficients with a sampling rate of 6 s/s, and are supplied to the coefficient convolution circuit 12.

The coefficient convolution circuit 12 combines the first filter coefficients and the second filter coefficients with each other by a convolution process. The transfer function of the combined filter coefficients is indicated as $S(z)P(z)A(z)$.

Among the combined filter coefficients, a single pattern of filter coefficients is selected in the coefficient selection circuit 14 in conformity with the input to the adaptive equalizer 7, and is set in the internal FIR filter of the adaptive equalizer 7. Selection of coefficients are sequentially updated every time sampling data in the received signal is input.

The adaptive equalizer 7 performs processes of the sampling frequency control, the phase adjustment and the adaptive equalization for the received signal at a sampling rate of 6 s/s by a single filtering process, and outputs the signal at a sampling rate of 6 s/s. The output signal passes through a ⅙ circuit 17, converted into a signal at a sampling rate of 1 s/s therein, and is finally output. The process in the adaptive equalizer 7 is performed at a sampling rate of 6 s/s, which can improve the accuracies of the sampling frequency control, the phase adjustment and the adaptive equalization accordingly, in comparison with the process at a sampling rate of 2 s/s in the comparison example in FIG. 2.

Embodiment 2

Figure 4:
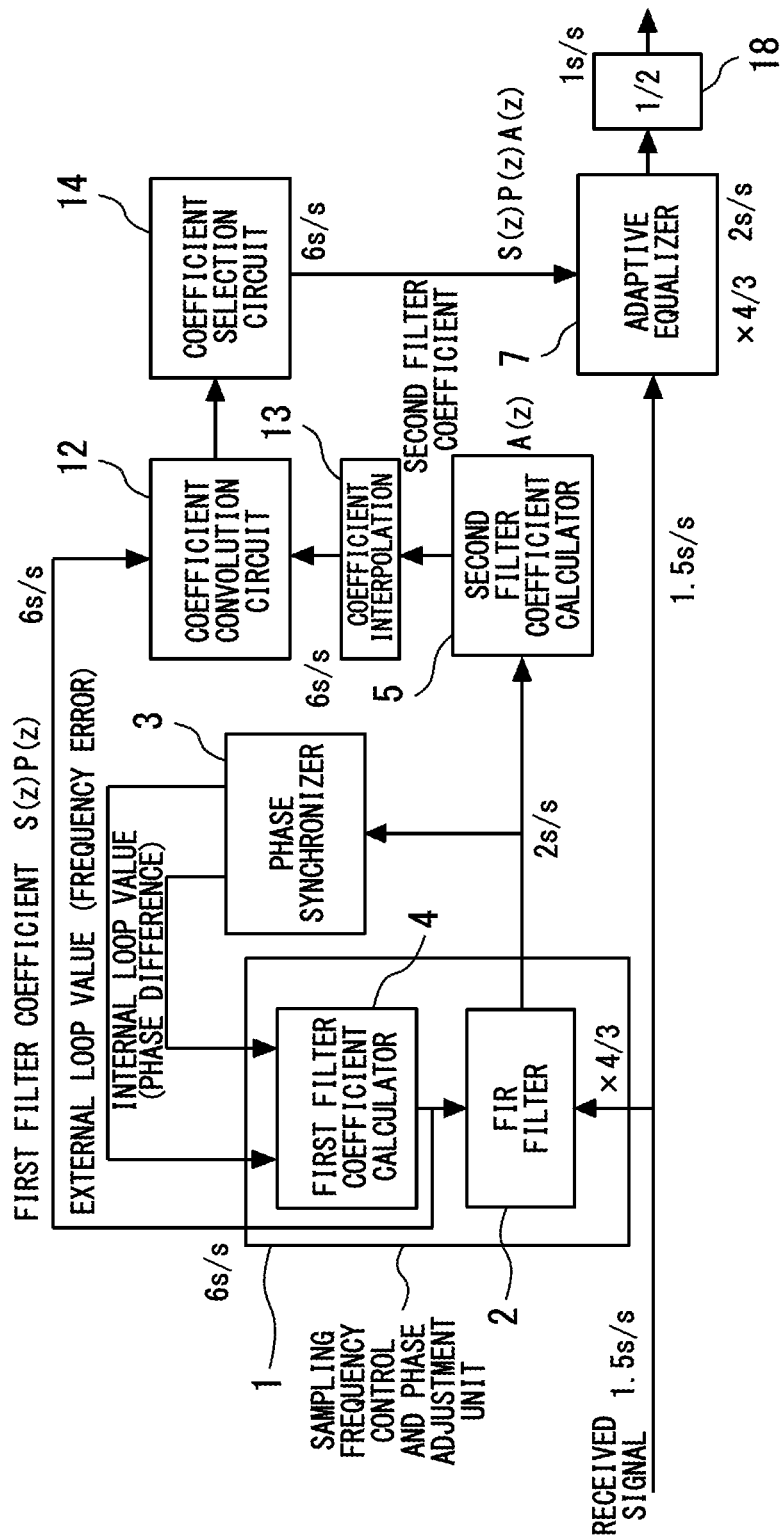
FIG. 4 shows an adaptive equalization device according to Embodiment 2.

FIG. 4 shows an adaptive equalization device according to Embodiment 2. The basic configuration is the same as that in Embodiment 1. However, processing methods of the FIR filter 2 of the sampling frequency control and phase adjustment unit 1 and of the FIR filter of the adaptive equalizer 7 are different from each other. Instead of the ⅙ circuit 17, a ½ circuit 18 is provided.

In Embodiment 1, the received signal at 1.5 s/s is interpolated by ×4 circuit 15 once, is subjected to the filter process by the FIR filter 2 of the sampling frequency control and phase adjustment unit 1, and is subsequently processed through the ⅓ circuit 16, thus obtaining the 2 s/s signal. However, in this embodiment, the ×4/3 processes of the FIR filter 2 of the sampling frequency control and phase adjustment unit 1 and the FIR filter of the adaptive equalizer 7 are performed at the same time for a received signal at 1.5 s/s. Specifically, through a convolution process in the FIR filter, only data calculated by a ×4/3 process is output. According to this method, the process of the FIR filter can be further simplified while the advantageous effect of improving the sampling rate is maintained. Calculation of multiplication with data inserted as zero by interpolation, and calculation of data that is not used owing to decimation can be omitted.

Furthermore, the sampling rate of the input signal into the FIR filter in the adaptive equalizer 7 is 1.5 s/s, which is lower than 2 s/s in the comparison example shown in FIG. 2. If the numbers of taps of the FIR filters are the same, 1.5 s/s has a higher sampling period, which can increase the temporal region for the process of the FIR filter accordingly. Consequently, the processing accuracy of the FIR filter can be improved, and the amount of performance degradation in a case of application of a load, such as of residual dispersion, can be reduced in comparison with the case of 2 s/s. Other configuration components and advantageous effects are similar to those in Embodiment 1.

Embodiment 3

Figure 5:
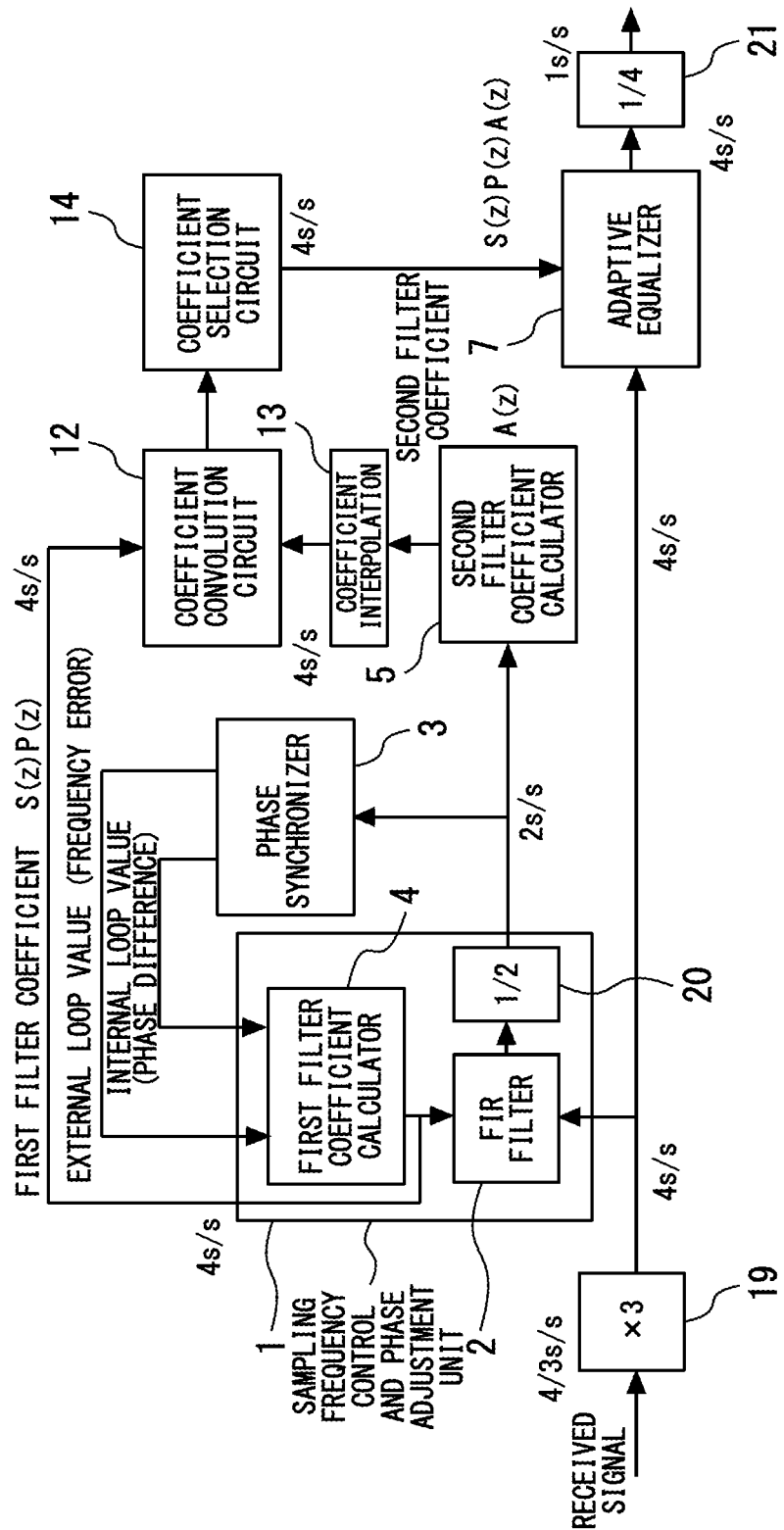
FIG. 5 shows an adaptive equalization device according to Embodiment 3.

FIG. 5 shows an adaptive equalization device according to Embodiment 3. The basic configuration is the same as that in Embodiment 1. However, the mode of sampling rate conversion is different. A received signal at a sampling rate of 4/3 s/s is supplied. The sampling rate of the received signal is converted by a ×3 circuit 19 from 4/3 s/s into 4 s/s.

In the sampling frequency control and phase adjustment unit 1, for the received signal converted to have 4 s/s, the processes of the sampling frequency control and the phase adjustment are performed by the FIR filter 2. The processed signal is converted by a ½ circuit 20 into a signal at a sampling rate of 2 s/s. From the output signal, the phase synchronizer 3 calculates the external loop value corresponding to the frequency error, and the internal loop value corresponding to the phase difference, and feeds these values back to the sampling frequency control and phase adjustment unit 1. The first filter coefficient calculator 4 of the sampling frequency control and phase adjustment unit 1 calculates, at a sampling rate of 4 s/s, the first filter coefficients for compensating the external loop value and the internal loop value at the same time, and sets the coefficients in the FIR filter 2. The FIR filter 2 performs the processes of the sampling frequency control and the phase adjustment at the same time. The processed signal is output through the ½ circuit 20 again. At this time, the first filter coefficients (sampling rate of 4 s/s) calculated in the sampling frequency control and phase adjustment unit 1 are supplied to the coefficient convolution circuit 12.

The filter process in the sampling frequency control and phase adjustment unit 1 described above is performed at a sampling rate of 4 s/s, which can improve the accuracies of the frequency control and the phase adjustment accordingly, in comparison with the process at a sampling rate of 2 s/s in the comparison example in FIG. 2.

On the other hand, the output signal at the sampling rate of 2 s/s having passed through the ½ circuit 20 is supplied to the second filter coefficient calculator 5. The second filter coefficient calculator 5 forms and updates the second filter coefficients for compensating the temporally changing distortion. The updated second filter coefficients are converted by the coefficient interpolation circuit 13 to have a sampling rate of 4 s/s, and are supplied to the coefficient convolution circuit 12.

The coefficient convolution circuit 12 combines the first filter coefficients and the second filter coefficients by a convolution process. The transfer function of the combined filter coefficients is indicated as S(z)P(z)A(z).

Among the combined filter coefficients, a single pattern of filter coefficients is selected in the coefficient selection circuit 14 in conformity with the input to the adaptive equalizer 7, and is set in the internal FIR filter of the adaptive equalizer 7. Selection of coefficients are sequentially changed every time sampling data in the received signal is input.

The adaptive equalizer 7 performs processes of the sampling frequency control, the phase adjustment and the adaptive equalization for the received signal at a sampling rate of 4 s/s by a single filtering process, and outputs the signal at a sampling rate of 4 s/s. The output signal is converted by a ¼ circuit 21 into a signal at a sampling rate of 1 s/s. Consequently, the received signal at a sampling rate of 4/3 s/s is subjected to the processes of the sampling frequency control, the phase adjustment and the adaptive equalization at the same time, and is output at a sampling rate of 1 s/s.

The process in the adaptive equalizer 7 is performed at a sampling rate of 4 s/s, and thus is performed at a higher sampling rate than the case of the process at the sampling rate of 2 s/s in the comparison example in FIG. 2. Consequently, the accuracies of the sampling frequency control, the phase adjustment and the adaptive equalization can be improved. Accordingly, signal degradation due to a computation error can be prevented, and performance improvement can be expected. Other configuration components and advantageous effects are similar to those in Embodiment 1.

Embodiment 4

Figure 6:
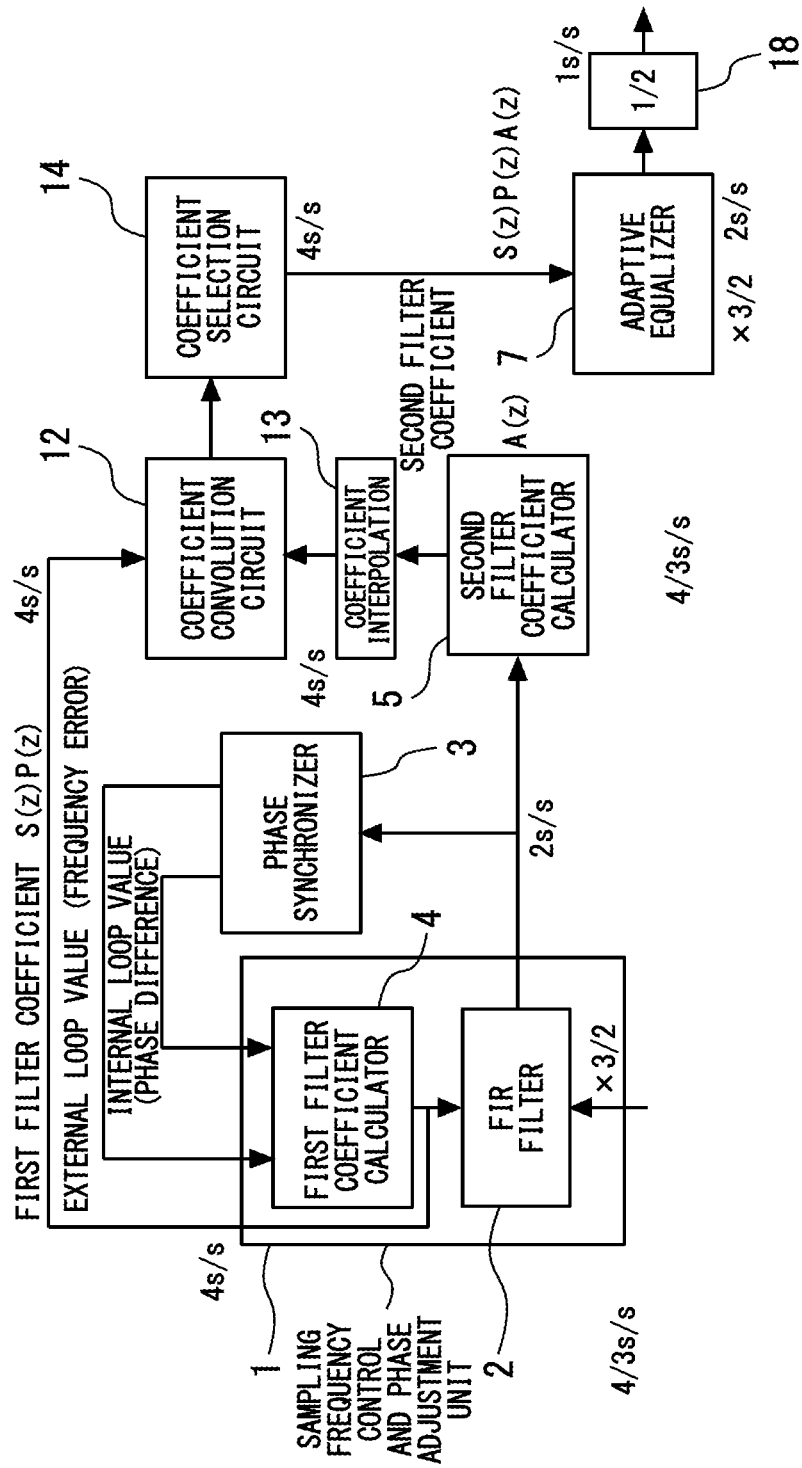
FIG. 6 shows an adaptive equalization device according to Embodiment 4.

FIG. 6 shows an adaptive equalization device according to Embodiment 4. The basic configuration is the same as that in Embodiment 3. However, processing methods of the FIR filter 2 of the sampling frequency control and phase adjustment unit 1 and of the FIR filter of the adaptive equalizer 7 are different. Instead of the ¼ circuit 21, a ½ circuit 18 is provided.

In Embodiment 3, the received signal at 4/3 s/s is interpolated by ×3 circuit 19 once, is subjected to the filter process by the FIR filter 2 of the sampling frequency control and phase adjustment unit 1, and is subsequently processed through the ½ circuit 20, thus obtaining the 2 s/s signal. However, in this embodiment, the ×3/2 processes of the FIR filter 2 of the sampling frequency control and phase adjustment unit 1 and the FIR filter of the adaptive equalizer 7 are performed at the same time for a received signal at 4/3 s/s. Specifically, through a convolution process in the FIR filter, only data calculated by a ×3/2 process is output. According to this method, the process of the FIR filter can be further simplified while the advantageous effect of improving the sampling rate is maintained. Calculation of multiplication with data inserted as zero by interpolation, and calculation of data that is not used owing to decimation can be omitted.

Furthermore, the sampling rate of the input signal into the FIR filter in the adaptive equalizer 7 is 4/3 s/s, which is lower than 2 s/s in the comparison example shown in FIG. 2. If the numbers of taps of the FIR filters are the same, 4/3 s/s has a higher sampling period, which can increase the temporal region for the process of the FIR filter accordingly. Consequently, the processing accuracy of the FIR filter can be improved, and the amount of performance degradation in a case of application of a load, such as of residual dispersion, can be reduced in comparison with the case of 2 s/s. Other configuration components and advantageous effects are similar to those in Embodiment 3.

As described above, Embodiments 1 and 3, or Embodiments 2 and 4 are different from each other only in sampling rate. The other basic configuration components are the same. Consequently, a configuration with another sampling rate can be achieved, and is also encompassed by the scope of the present disclosure.

In the adaptive equalization devices according to Embodiments 1 to 4, the processing accuracy of the filter can be improved by including sampling rate conversion, and calculation of multiplication with data inserted as zero by interpolation and calculation of data that is not used owing to decimation can be omitted. However, even in a case where the sampling rate conversion is not included, the filter process of the phase adjuster 9 and the filter process in the adaptive equalizer 7 can be commonly integrated as described above. Accordingly, the number of computation processes for the entire sampling data becomes one, which prevents signal degradation due to a computation error, and performance improvement can be expected.

Note that the adaptive equalization may be performed by recording a program for realizing the adaptive equalization methods according to Embodiments 1 to 4 in a computer-readable recording medium, making a computer system or a programmable logic device read the program recorded in the recording medium, and executing it. Note that the "computer system" here includes an OS and hardware such as a peripheral device or the like. In addition, the "computer system" also includes a WWW system including a homepage providing environment (or display environment). Furthermore, the "computer-readable recording medium" is a portable medium such as a flexible disk, a magneto-optical disk, a ROM or a CD-ROM, or a storage device such as a hard disk built in the computer system. Further, the "computer-readable recording medium" also includes the one holding the program for a fixed period of time, such as a volatile memory (RAM) inside the computer system to be a server or a client in the case that the program is transmitted through a network such as the Internet or a communication channel such as a telephone line. In addition, the program may be transmitted from the computer system storing the program in the storage device or the like to another computer system through a transmission medium or a transmission wave in the transmission medium. Here, the "transmission medium" that transmits the program is a medium having a function of transmitting information like the network (communication network) such as the Internet or the communication channel (communication line) such as the telephone line. Furthermore, the program may be the one for realizing a part of the above-described function. Further, it may be the one capable of realizing the above-described function by a combination with the program already recorded in the computer system, that is, a so-called difference file (difference program).

REFERENCE SIGNS LIST 1 sampling frequency control and phase adjustment unit (first compensation circuitry); 2 FIR filter (first digital filter); 4 first filter coefficient calculator; 5 second filter coefficient calculator; 6 coefficient combiner; 7 adaptive equalizer (second compensation circuitry)

The invention claimed is:

1. An adaptive equalization device comprising:
   first compensation circuitry including a first digital filter compensating a phase difference between a phase of a symbol of a received signal and a sampling timing, and first filter coefficient calculation circuitry calculating a filter coefficient of the first digital filter as a first filter coefficient;
   second filter coefficient calculation circuitry calculating, as a second filter coefficient, a filter coefficient for adaptive equalization configured to compensate distortion due to temporally changing polarization dispersion, based on an output of the first digital filter;
   coefficient combination circuitry combining the first filter coefficient and the second filter coefficient; and
   second compensation circuitry including a second digital filter configured to use a filter coefficient combined by the coefficient combination circuitry and configured to perform a compensation of the phase difference between the phase of the symbol of the received signal and the sampling timing, and a process of the adaptive equalization at the same time.

2. The adaptive equalization device according to claim 1, wherein the first digital filter is configured to compensate a frequency error between a symbol rate of the received signal and a sampling frequency, and
   the second digital filter is configured to use the filter coefficient combined by the coefficient combination circuitry and performs the compensation of the phase difference between the phase of the symbol of the received signal and the sampling timing, a compensation of the frequency error between the symbol rate of the received signal and the sampling frequency, and the process of the adaptive equalization at the same time.

3. The adaptive equalization device according to claim 1, wherein a process of the first digital filter is performed not for entire sampling data of the received signal but for only 50% to 25% sampling data as a level achieving phase synchronization.

4. The adaptive equalization device according to claim 1, wherein a sampling rate conversion is performed at the same time as processes of the first and second digital filters.

5. The adaptive equalization device according to claim 4, wherein the first and second digital filters are configured to convert a sampling rate by interpolation and decimation and process only data to be output.

6. An adaptive equalization method performing adaptive equalization for a received signal by an adaptive equalization device, comprising:
   compensating a phase difference between a phase of a symbol of the received signal and a sampling timing by a first digital filter;
   calculating a filter coefficient of the first digital filter as a first filter coefficient by first filter coefficient calculation circuitry;
   calculating, as a second filter coefficient, a filter coefficient for adaptive equalization that compensates distortion due to temporally changing polarization dispersion, based on an output of the first digital filter by second filter coefficient calculation circuitry;
   combining the first filter coefficient and the second filter coefficient by coefficient combination circuitry; and
   using a filter coefficient combined by the coefficient combination circuitry and performing a compensation of the phase difference between the phase of the symbol of the received signal and the sampling timing, and the adaptive equalization at the same time by a second digital filter.

7. A communication device comprising a adaptive equalization device comprising:
   first compensation circuitry including a first digital filter compensating a phase difference between a phase of a symbol of a received signal and a sampling timing, and first filter coefficient calculation circuitry calculating a filter coefficient of the first digital filter as a first filter coefficient;
   second filter coefficient calculation circuitry calculating, as a second filter distortion due to temporally changing polarization dispersion, based on an output of the first digital filter;
   coefficient combination circuitry combining the first filter coefficient and the second filter coefficient; and
   second compensation circuitry including a second digital filter configured to use a filter coefficient combined b the coefficient combination circuit and configured to perform a compensation of the phase difference between the phase of the symbol of the received signal and the sampling timing, and a process of the adaptive equalization at the same time.

* * * * *